United States Patent
Chiu et al.

(10) Patent No.: US 9,361,032 B2
(45) Date of Patent: Jun. 7, 2016

(54) MANAGEMENT OF SERVER CACHE STORAGE SPACE

(71) Applicant: International Business Machines Corporation, Armonk, NY (US)

(72) Inventors: Lawrence Y. Chiu, Saratoga, CA (US); Hyojun Kim, San Jose, CA (US); Maohua Lu, San Jose, CA (US); Paul H. Muench, San Jose, CA (US); Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 14/277,154

(22) Filed: May 14, 2014

(65) Prior Publication Data

US 2015/0331622 A1     Nov. 19, 2015

(51) Int. Cl.
  *G06F 12/00*    (2006.01)
  *G06F 3/06*     (2006.01)
  *G06F 12/08*    (2016.01)

(52) U.S. Cl.
  CPC .............. *G06F 3/0619* (2013.01); *G06F 3/067* (2013.01); *G06F 3/0679* (2013.01); *G06F 12/0806* (2013.01); *G06F 2206/1014* (2013.01); *G06F 2212/62* (2013.01)

(58) Field of Classification Search
  CPC . G06F 3/067; G06F 3/0641; G06F 17/30156; G06F 3/0679; G06F 3/0619; G06F 2206/1014; G06F 12/0806; G06F 2212/62; G06F 11/1453; G06F 3/065
  USPC .................. 711/102, 113, 103; 709/223–224, 709/226–227, 229
  See application file for complete search history.

(56) References Cited

U.S. PATENT DOCUMENTS

| | | | |
|---|---|---|---|
| 2010/0023682 A1 | 1/2010 | Lee et al. | |
| 2011/0276781 A1 | 11/2011 | Sengupta et al. | |
| 2011/0296085 A1 | 12/2011 | Eleftheriou et al. | |
| 2013/0042066 A1* | 2/2013 | Price | G06F 12/0866 711/119 |
| 2013/0111106 A1 | 5/2013 | Benhase et al. | |
| 2013/0205077 A1 | 8/2013 | Benhase et al. | |
| 2013/0226884 A1 | 8/2013 | Provenzano | |
| 2013/0226959 A1 | 8/2013 | Dittrich et al. | |
| 2015/0134625 A1* | 5/2015 | Lentini | H04L 67/2857 707/692 |

OTHER PUBLICATIONS

Anonymous, "Method and System for Reducing Storage Consumption using Virtual Storage Blocks and Block-Level Virtualization and Deduplication," An IP.com Prior Art Database Technical Disclosure, Mar. 22, 2010 IP.com No. IPCOM000194381D.

(Continued)

*Primary Examiner* — Jasmine Song
(74) *Attorney, Agent, or Firm* — Richard A. Wilhelm; Bryan Butler

(57) ABSTRACT

An application server can be configured to access data stored on a networked storage server that is accessible over a network and that includes a cache device configured to store data received from the networked storage server. The application server can include a cache management module that is designed to monitor a data access requests transmitted over the network, the data access requests specifying a first page of data. In response to an indication that the requested data includes data stored in the cache device as an existing page of data, the first page of data can be mapped to a location corresponding to the existing page.

17 Claims, 5 Drawing Sheets

(56) References Cited

OTHER PUBLICATIONS

Anonymous, "Method to prolong the life of a Multi-Level Cell Flash Disk Cache," An IP.com Prior Art Database Technical Disclosure, Sep. 24, 2010 IP.com No. IPCOM000200055D.

Anonymous, "Efficient Data Fetching Over Low Bandwidth Network/Cloud," an IP.com Prior Art Database Technical Disclosure, Aug. 2, 2012 IP.com No. IPCOM000220500D.

Debnath et al., "ChunkStash: Speeding up Inline Storage Deduplication using Flash Memory," Proceedings of the 2010 USENIX conference on USENIX annual technical conference, USENIX Association, Berkeley, CA, © 2010.

Dufrasne et al., "IBM System Storage DSS8000 Easy Tier Server," Aug. 2013, 94 pages, IBM Redbooks. http://www.redbooks.ibm.com/redpapers/pdfs/redp5013.pdf.

Unknown, "Introduction to EMC XtremSW Cache," White Paper, 33 Pages, Aug. 2013, © 2013 EMC Corporation http://www.emc.com/collateral/hardware/white-papers/h10502-vfcache-intro-wp.pdf.

* cited by examiner

MANAGEMENT OF SERVER CACHE STORAGE SPACE

BACKGROUND

The present disclosure relates to cache management, and more specifically, to deduplication in application server caches.

Application servers can be configured to provide a variety of different services and applications to end users. In some instances the applications and services may rely upon access to large amounts of data; moreover, multiple application servers may rely upon the same or similar data. Certain systems use networked storage or a networked storage server (e.g., a storage area network (SAN)) that can be configured to provide data for use by application servers (or "clients" of the networked storage). The networked storage can be maintained as a separate entity from the application servers. For instance, the storage devices can be accessible over a network that allows the application servers to be located and maintained in (logically and/or physically) remote locations.

A networked storage can include a high-speed special-purpose network that interconnects different kinds of data storage devices with associated data servers that are accessible by clients and applications. A storage area network can be clustered in close proximity to other computing resources such as mainframes but may also include remote locations. Certain networked storages can support various data functions, such as disk mirroring, backup, archiving of data, data migration from one storage device to another and the sharing of data among different servers in a network.

SUMMARY

Certain embodiments are directed toward a computer implemented method in which a request is transmitted, to at least one networked storage server and over a network, for a first page of data stored on the at least one networked storage server to an application server. In response to the request and over the network, an indication is received that the first page of data is a duplicate of a second page of data stored within a cache that is locally accessibly by the application server relative to the network. In response to the indication, a location of the second page of data within the cache is identified and the first page of data is mapped to the location.

Embodiments are directed toward a system having an application server configured to access data stored on a networked storage server that is accessible over a network. The application server includes a cache device configured to cache data stored on the networked storage server, and a cache management module that is designed to: monitor a data access requests transmitted over the network, the data access requests specifying a first page of data; detect, in response to at least one request of the data access requests, an indication that data corresponding to the at least one request is a duplicate of data stored in the cache device as an existing page of data; identify, in response to the indication, a location of the existing page of data within the cache device; and map the first page of data to the location.

Various embodiments are directed toward a computer program product having a computer readable storage medium having program instructions embodied therewith, the program instructions executable by a computer to cause the computer to perform a method including: transmitting, over a network, a request to provide a first page of data stored on at least one networked storage server to an application server; receiving, in response to the request, an indication that the first page of data is a duplicate of the a second page of data stored within a cache located between the application server and the network; identifying, in response to the indication, a location of the second page of data within a cache; and mapping the first page of data to the location The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
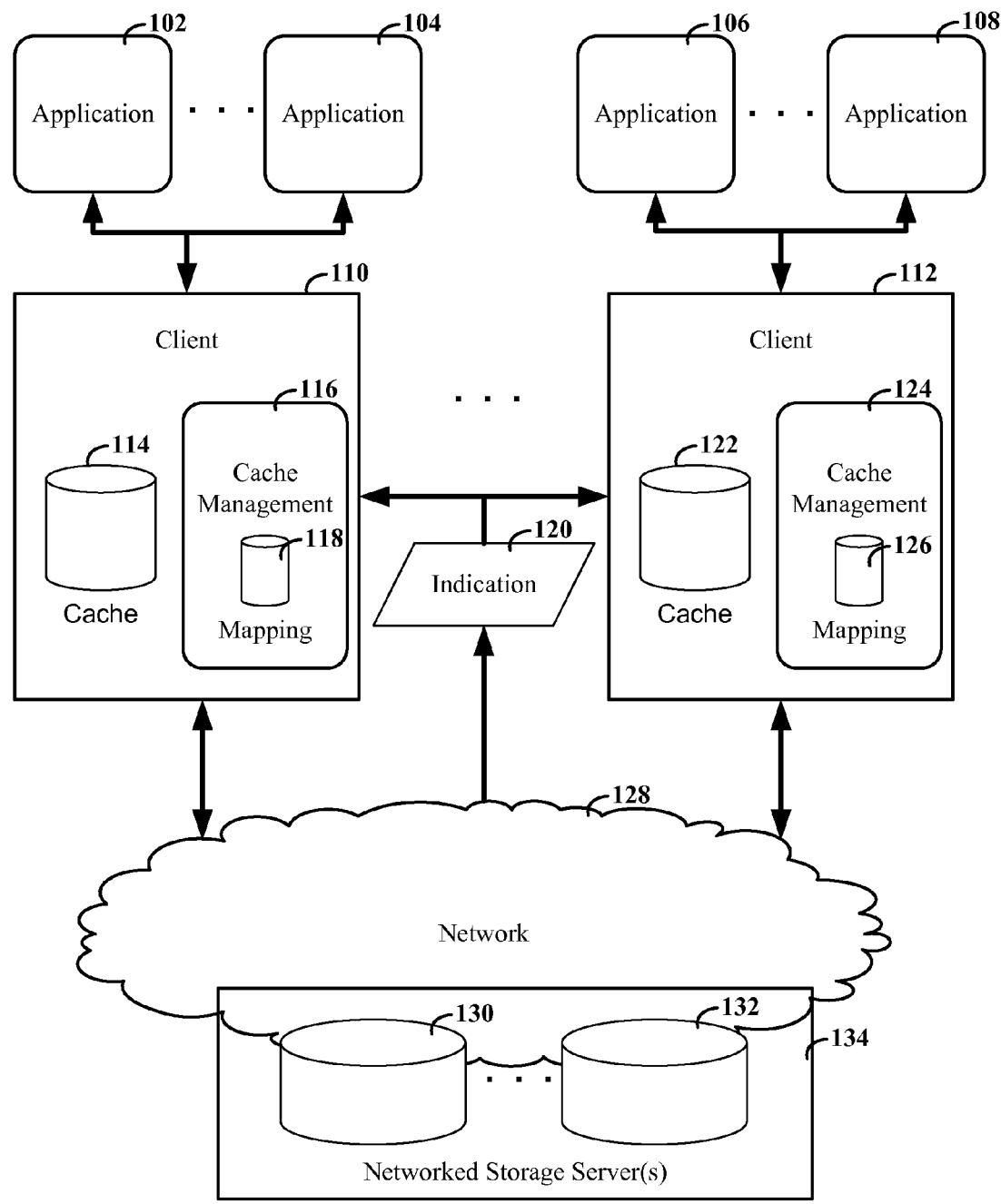
FIG. 1 depicts a block diagram of a system for providing deduplication in one or more caches, consistent with embodiments of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

DETAILED DESCRIPTION

Aspects of the present disclosure relate to cache management, more particular aspects relate to deduplication in application server caches. While the present disclosure is not necessarily limited to such applications, various aspects of the disclosure may be appreciated through a discussion of various examples using this context.

Consistent with embodiments of the present disclosure a storage cache device can be used between application server(s) and networked storage server(s). The application servers can be referred to as "clients' of the networked storage. The cache can be configured to store data retrieved from the networked storage. In particular embodiments, the cache can use solid state memory devices (SSD), such as flash based memory. Aspects of the present disclosure allow for deduplication to be performed using input from a component external (i.e., not inline) to the cache storage device. This can be particularly useful for increasing the effective size of the cache device as seen by the client.

According to certain embodiments, a system can be configured to use information received from the networked storage to identify duplicate segments of data. These segments of data can be set to a particular size depending upon the particular configuration. In certain embodiments, the segments could correspond to the memory page size for a client. A page (memory page or virtual page) can be a contiguous block of virtual memory that is used in memory allocation performed by the operating system for an application or program. For ease of discussion, the term page (or memory page) is used herein, however, embodiments allow for the size of the data segment to be different than the page size of a client. For instance, the page size of a client or application could be virtualized by a hypervisor or firmware, which could use different sized segments of data for memory accesses. For instance, a client could be configured with large page sizes that the hypervisor could break into smaller pages when accessing the cache and networked storage.

Consistent with embodiments, a networked storage may implement deduplication on data within its storage volumes in order to reduce the amount of storage space that is used to store a set amount of data. Data content that is stored in the cache device can be monitored and tracked so that the duplicate information generated by the networked storage can be correlated to the tracked data in order to identify duplicate data within the cache device.

Embodiments are directed toward a (dedicated) deduplication server that can be configured to identify duplicate data within the cache and then provide indications of the duplicate data to different application servers. For instance, the deduplication server can be configured to identify duplicate data stored within the networked storage and/or to track the contents of one or more application server caches by monitoring accesses to the networked storage. The data content of data requests can be compared with the contents of what is already stored in the application server-side cache device. If a match is detected, the deduplication server can send an indication of the match. The indication can include information about the location of the existing data within the cache device. The application server can then modify its page mapping to direct access for the currently requested page to the existing page in the cache device.

Consistent with certain embodiments, more than two pages can be mapped to the same location (and page data) within the cache device when three or more pages contain the same data content. This can allow for three times (or more) savings in cache storage space for such pages.

Aspects of the present disclosure are also directed toward cache coherency management. For instance, if data for a particular page is modified, then the mapping/association between two duplicate pages can be removed. For instance, the system can detect when a write is made to a location in the networked storage that corresponds to a location in cache for which multiple pages are mapped. Accordingly, the data in one location of the networked storage may have changed relative to the other location and they are no longer duplicates. The mapping can then be removed between the pages and the common location in the cache. Various embodiments relate to cache management for a cache device that functions in a write-through mode in which consistency between the networked storage contents and the cache are maintained by forwarding all writes to the networked storage without delay.

Various embodiments are directed toward the use of data fingerprints derived from the data content of the pages. For instance, the fingerprint could be created using an algorithm that generates a (statistically) unique identifier from the data. Non-limiting examples of an algorithm include secure hash algorithm (SHA)-1, SHA-2 or other hash algorithms. These fingerprints can be generated and used by a networked storage system or a dedicated deduplication module.

Embodiments of the present disclosure relate the recognition that implementing inline deduplication detection and monitoring solution for a cache device can use considerable processing power and memory. For instance, calculating fingerprints for each relevant cache access (read miss or write) can use a non-trivial amount of processing resources and result in delayed access times. Moreover, storage of the fingerprints can consume additional memory. An inline deduplication for a cache device may also use additional dedicated hardware, which takes up valuable space, draws additional power, creates more heat and adds complexity. Accordingly, various embodiments are directed toward a system in which the monitoring and identification of the duplicate data can be made by a system external to the cache. Embodiments allow for the identification of duplicate data to be made on the data stored in the networked storage, and then correlated to corresponding data stored in the cache. In this manner, the fingerprint generating, related data access, and fingerprint storage, can each be done independent from the cache devices and from memory/data access requests.

Turning now to the figures, FIG. 1 depicts a block diagram of a system for providing deduplication in one or more caches, consistent with embodiments of the present disclosure. One or more clients (also referred to herein as application servers) 110, 112 can be configured to support one or more applications 102, 104, 106, 108. The clients and applications can reside on separate physical computer servers or on the same physical server. For instance, the applications (and clients) can be supported on a virtualized platform using one or more hypervisor modules.

The clients 110, 112 can have one or more application server side cache devices 114, 122. In some embodiments, the cache devices can be solid state drive (SSD) devices. A particular example includes Peripheral Component Interconnect Express (PCIe) type SSDs that are accessible using an input/output (I/O) computer motherboard bus of the application server and that are used for caching purposes. Other types of storage devices are also possible. The cache devices can be configured to store data requested by the clients and applications. One or more cache management modules 116, 124 can be configured to facilitate access to the cache devices. For instance, when a page is requested by an application a cache management module can determine whether or not the page is already stored in the cache (a cache "hit"). If not, then the requested page can be requested from the networked storage 134.

Networked storage 134 can include networked storage servers that manage access to one or more storage volumes 130, 132 and can be accessible over a network 128. In some embodiments, the networked storage can include different types of storage volumes or another networked storage. The storage volumes can be collocated, located at different locations and combinations thereof. Network 128 can include one or more wide area networks (WAN) (e.g., the Internet), local area networks (LAN) (e.g., a private network), storage area networks (SAN) and combinations thereof.

According to embodiments of the present disclosure, the clients and cache management modules can be configured to provide deduplication of data stored in the corresponding cache device. The deduplication can be carried out in response to receiving an indication of duplicate data 120. This indication can be received from a source external to the client. In certain embodiments, the indication 120 can be generated by the networked storage. For instance, the networked storage may be configured to perform a deduplication function on data stored within its storage volumes. Data from this deduplication function can be correlated to an incoming request for data. If the requested data is a duplicate of data stored in another location(s) of the networked storage, then an indication of the other locations can be provided to the cache management module. The cache management module can determine whether or not the cache device already contains data corresponding to the other locations (e.g., using fingerprint information). If so, this data can be used by the requesting application to modify the (page) mapping 118, 126 so that accesses to the requested page are directed toward the existing, duplicate data in the cache device.

Consistent with certain embodiments, the networked storage can monitor the data contents of the cache and then directly correlate an incoming request for data with data stored in the cache. An indication can then be generated that expressly identifies the corresponding location within the cache.

According to embodiments, the request from an application or client can be generated in response to the application requesting a virtual memory page that generates a page fault (e.g., when the memory request corresponds to a page that does not currently reside in main memory). The hardware or operating system can be configured to identify the location of the requested page using mapping 118, 126 between the virtual memory page and the actual location within the networked storage. As discussed herein, this mapping can be adjusted to redirect a request to a location in cache that contains duplicate data.

Various embodiments are directed toward a dedicated deduplication server or client that is configured to identify duplicate data within the networked storage. This identification can be carried out offline, or independently, from data accesses to the networked storage by applications. The dedicated deduplication server can monitor data accesses for a location in the networked storage that the cache does not contain corresponding data (a cache "miss"). An indication can be generated if the cache miss is for data that is a duplicate of data stored in another location(s) of the networked storage. This indication can be provided to the client requesting the data, which can modify the mapping to direct the memory/data access request to a location within the cache that includes the duplicate information. The resulting mapping directs memory accesses to the same location within the cache for both the page associated with the original data and the page associated with the newly identified duplicate data.

Figure 2:
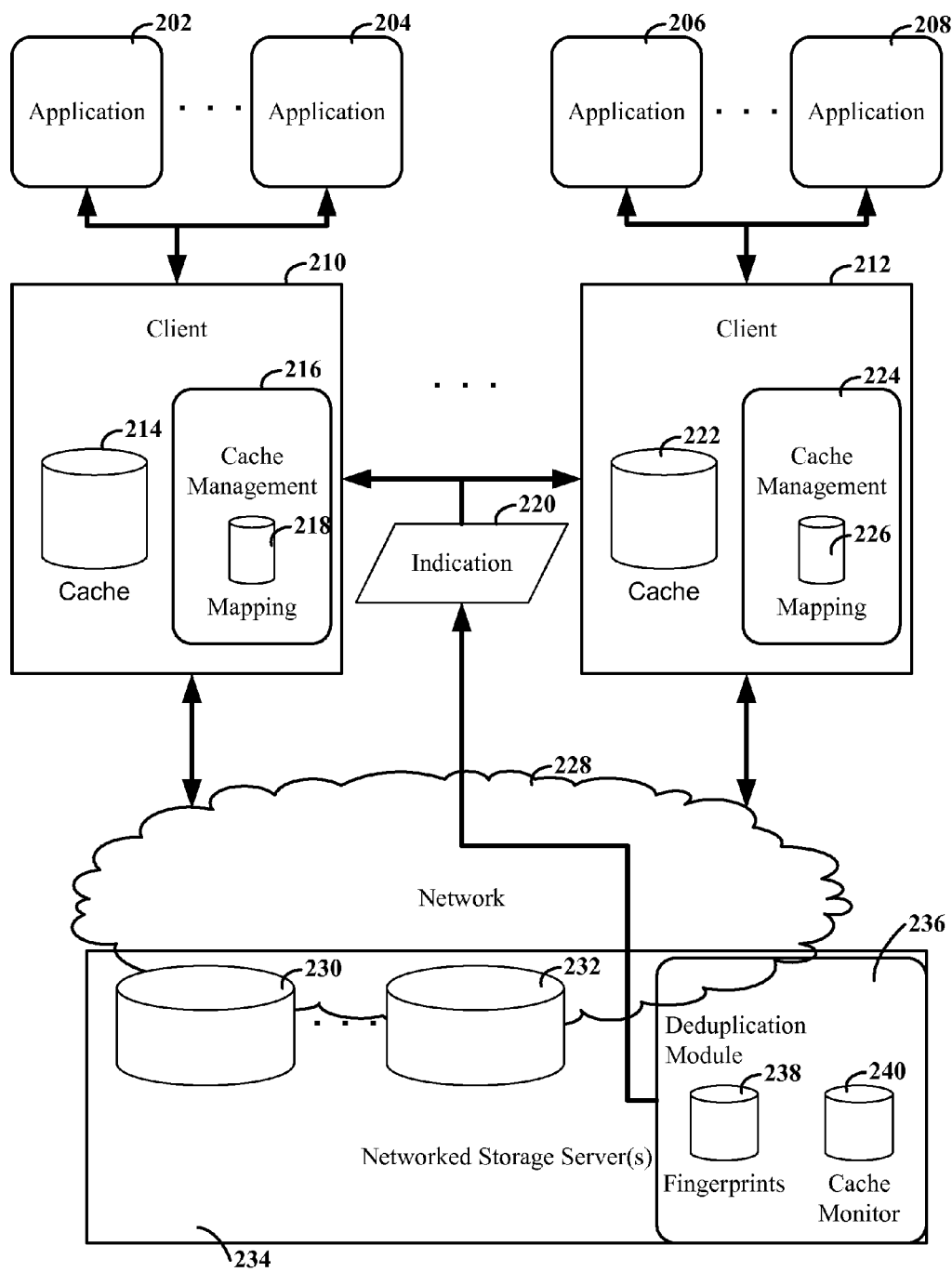
FIG. 2 depicts a block diagram of a system for providing deduplication in one or more caches using an indication provided by a networked storage, consistent with embodiments of the present disclosure.

FIG. 2 depicts a block diagram of a system for providing deduplication in one or more caches using an indication provided by a networked storage, consistent with embodiments of the present disclosure. As discussed herein, the system of FIG. 2 can include applications 202, 204, 206, 208 that run on one or more clients 210, 212. The clients can facilitate access to a networked storage 234 and associated storage volumes 230, 232 through network 228. One or more cache devices 214, 222 can cache data from the networked storage to provide fast access times for subsequent requests for the data. Cache management modules 216, 224 can be configured to provide (and modify) mappings 218, 226 between cache memory locations and virtual memory locations of the applications (or clients).

Consistent with embodiments, the networked storage can include a deduplication module 236. The deduplication module can be configured to provide deduplication functions for data stored in the networked storage. The deduplication module can also be configured to use information related to these deduplication functions to generate indications 220. The indications can then be used to carry out deduplication functions for the cache devices. For instance, the deduplication module can use fingerprint data 238, derived from data stored in the networked storage, to detect duplicate data within the cache devices.

For instance, location A and B in the networked storage can contain duplicate data. Location A may have been previously accessed and thereby reside in the cache of a client. If a page fault is subsequently generated while attempting to access a page corresponding to location B, the deduplication module can detect that data corresponding to page A is the same as data corresponding to page B. In response to this detection, the deduplication module can provide an indication that there is duplicate data corresponding to the request. The page mapping for page B can then be changed such that when a client subsequently tries to access to either page A or page B, the access request will be directed toward the cache location corresponding to page A.

Various embodiments are directed toward cache monitoring by the deduplication module. For instance, the deduplication module can store information about which data segments or pages are stored in the cache(s) in a cache monitor database 240. The deduplication module can use the monitor information to generate indications for duplicate information separate from a request for data. This may include the use of an off-line deduplication process that correlates duplicate data pages with information about which pages currently reside in the cache. If duplicate pages are detected, the deduplication module can generate an indication and the cache mapping can be changed to redirect access requests for the duplicate pages to a common location within the cache. The remaining page(s) can then be released to allow for other pages to be stored in the cache.

In certain embodiments, the cache monitor database can be used by the deduplication module to proactively update mappings for duplicate pages. For instance, the deduplication module can detect when a new page is being populated into the cache and then determine whether the new page has one or more duplicate pages in the networked storage. The deduplication module can provide an indication identifying the one or more duplicate pages even where the one or more duplicate pages are not yet in the cache. The mappings can then be updated such that future accesses to any of these duplicate pages will be directed toward a single location in the cache without further intervention from the deduplication module.

According to certain embodiments, the deduplication module can be configured to generate fingerprint data for blocks of data that have a size that is the same as the page size for the clients. In certain instances, the blocks of data can be of a different size than the page size (the page sizes might also be different for different clients). This may result in a request for one page resulting in the retrieval of data for which there exists two or more fingerprints. In certain embodiments, the deduplication module can be configured to verify that all relevant blocks of data are duplicates before providing an indication that a particular page is a duplicate (e.g., by comparing all relevant fingerprints).

Figure 3:
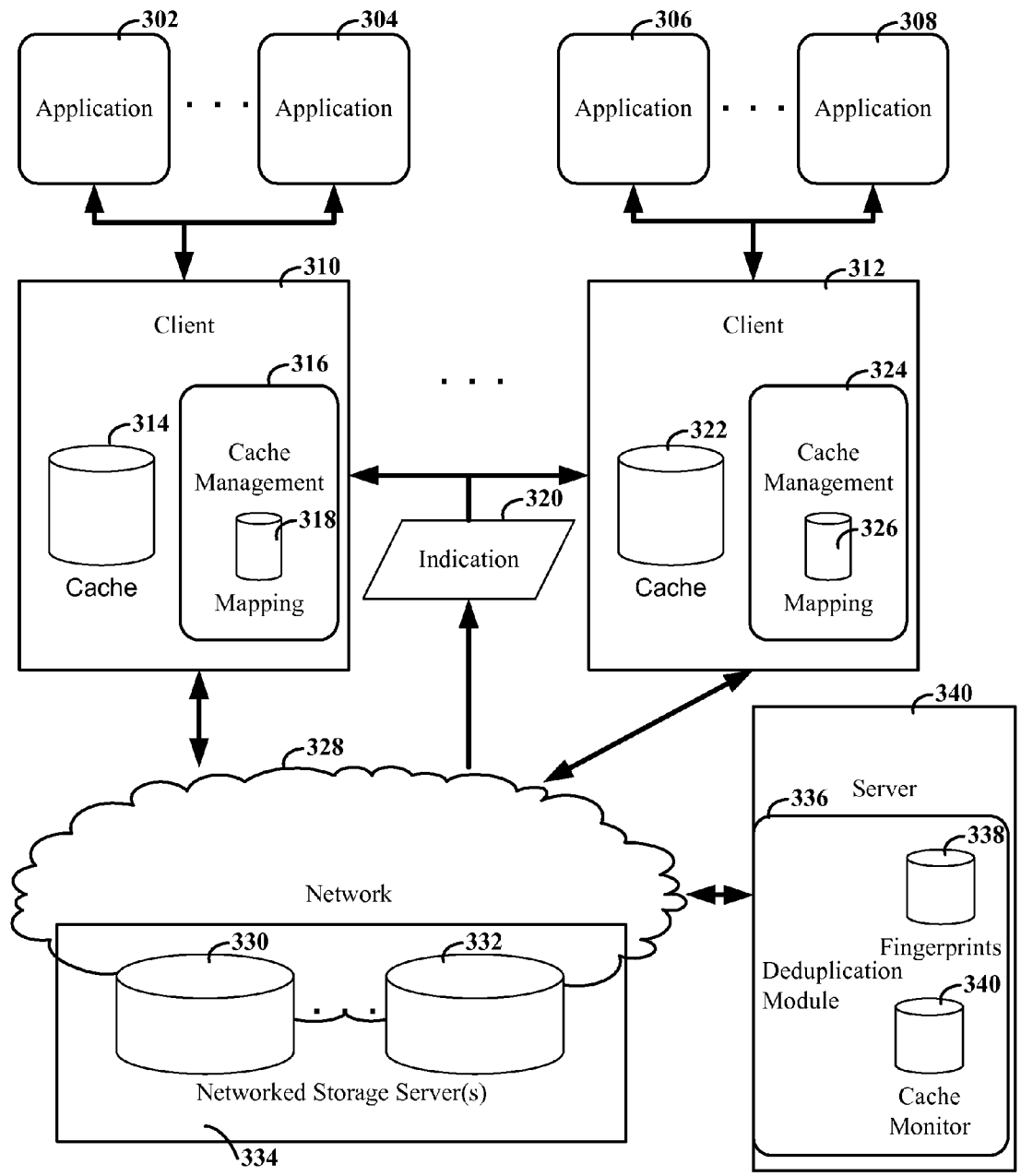
FIG. 3 depicts a block diagram of a system for providing deduplication in one or more caches using an indication provided by a dedicated server module, consistent with embodiments of the present disclosure.

FIG. 3 depicts a block diagram of a system for providing deduplication in one or more caches using an indication provided by a dedicated server module, consistent with embodiments of the present disclosure. As discussed herein, the system of FIG. 3 can include applications 302, 304, 306, 308 that run on one or more clients 310, 312. The clients can provide access to a networked storage 334, and associated storage volumes 330, 332, through network 328. One or more cache devices 314, 322 can cache data from the networked storage to provide fast access times for subsequent requests for the data by applications and clients. Cache management modules 316, 324 can be configured to modify mappings 318, 326 between cache memory locations and virtual memory locations of the applications.

Embodiments are directed toward a server 340 that includes one or more deduplication modules 336. The deduplication module can be configured to identify duplicate data segments within the networked storage. The deduplication module can also be configured to monitor access requests for these data segments and provide an indication 320 when such access requests are for data content that is duplicated in at least one other location within the networked storage. If the duplicate data for the data request is already in the cache device, then this indication can result in the requested data being retrieved directly from the cache device. This retrieval can include modifying the memory mappings in order to link the requested data location to the data location already stored in the cache.

According to certain embodiments, the deduplication module can be configured to generate a fingerprint database 338 for the data stored in the networked storage and to detect requests for duplicate data by comparing the fingerprints. In certain embodiments, the fingerprints can be generated as a background process (e.g., "offline" or independently) relative to access requests by clients and applications. In this manner, the processing required to generate the fingerprints can be carried out before a particular access request is received and without slowing the access request. The fingerprint data can also be stored without using storage space of the cache device or client.

Embodiments allow for cache monitoring by the deduplication module. For instance, the deduplication module can store information about which data segments or pages are stored in the cache(s) in a cache monitor database 340. As discussed herein, this monitoring can facilitate decoupling of memory/data access requests from the generation of the indications and related mapping.

Figure 4:
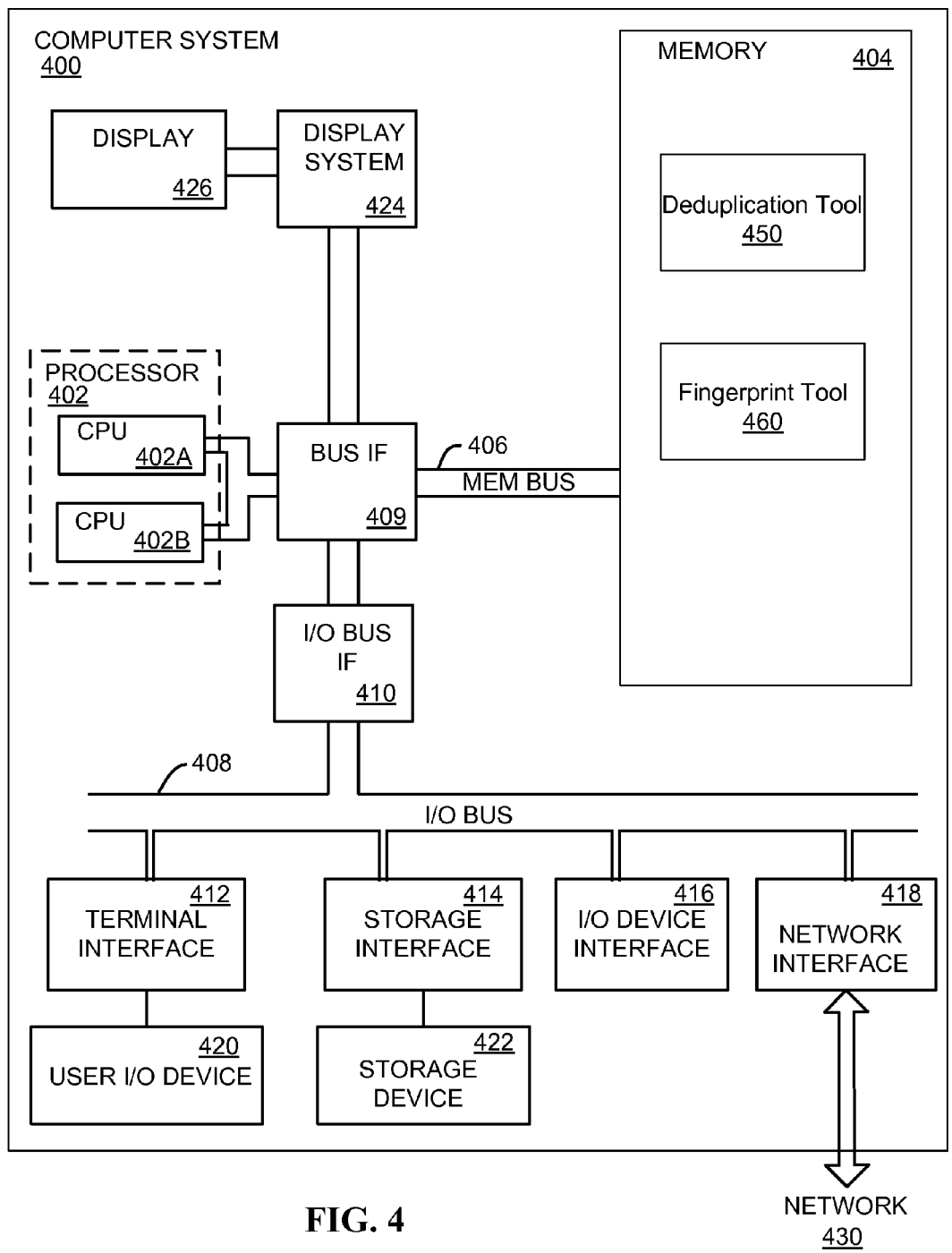
FIG. 4 depicts a high-level block diagram of a computer system, consistent with embodiments of the present disclosure.

FIG. 4 depicts a high-level block diagram of a computer system 400 consistent with various embodiments of the present disclosure. The mechanisms and apparatus of the various embodiments disclosed herein apply equally to any appropriate computing system. The major components of the computer system 400 include one or more processors 402, a memory 404, a terminal interface 412, a storage interface 414, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions stored in the memory 404 and may include one or more levels of on-board cache.

In embodiments, the memory 404 may include a random-access semiconductor memory, storage device, or storage medium (either volatile or non-volatile) for storing or encoding data and programs. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can store deduplication tool or module 450 and/or fingerprint tool or module 460. Consistent with certain embodiments, these tools can be implemented as part of one or more monitor threads. These programs and data structures are illustrated as being included within the memory 404 in the computer system 400, however, in other embodiments, some or all of them may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, while the deduplication tool 450 and the fingerprint tool 460 are illustrated as being included within the memory 404, these components are not necessarily all completely contained in the same storage device at the same time. Further, although the deduplication 450 and the fingerprint tool 460 are illustrated as being separate entities, in other embodiments some of them, portions of some of them, or all of them may be packaged together (e.g., as part of the same monitor thread).

In embodiments, the deduplication tool 450 and the fingerprint tool 460 may include instructions or statements that execute on the processor 402 or instructions or statements that are interpreted by instructions or statements that execute on the processor 402 to carry out the functions as further described below. In certain embodiments, the deduplication tool 450 and the fingerprint tool 460 can be implemented in hardware via semiconductor devices, chips, logical gates, circuits, circuit cards, and/or other physical hardware devices in lieu of, or in addition to, a processor-based system. In embodiments, the deduplication tool 450 and the fingerprint tool 460 may include data in addition to instructions or statements.

The computer system 400 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 410 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 may be implemented as a desktop computer, portable computer, laptop or notebook computer, tablet computer, pocket computer, telephone, smart phone, or any other suitable type of electronic device.

FIG. 4 depicts a representative of certain major components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

Figure 5:
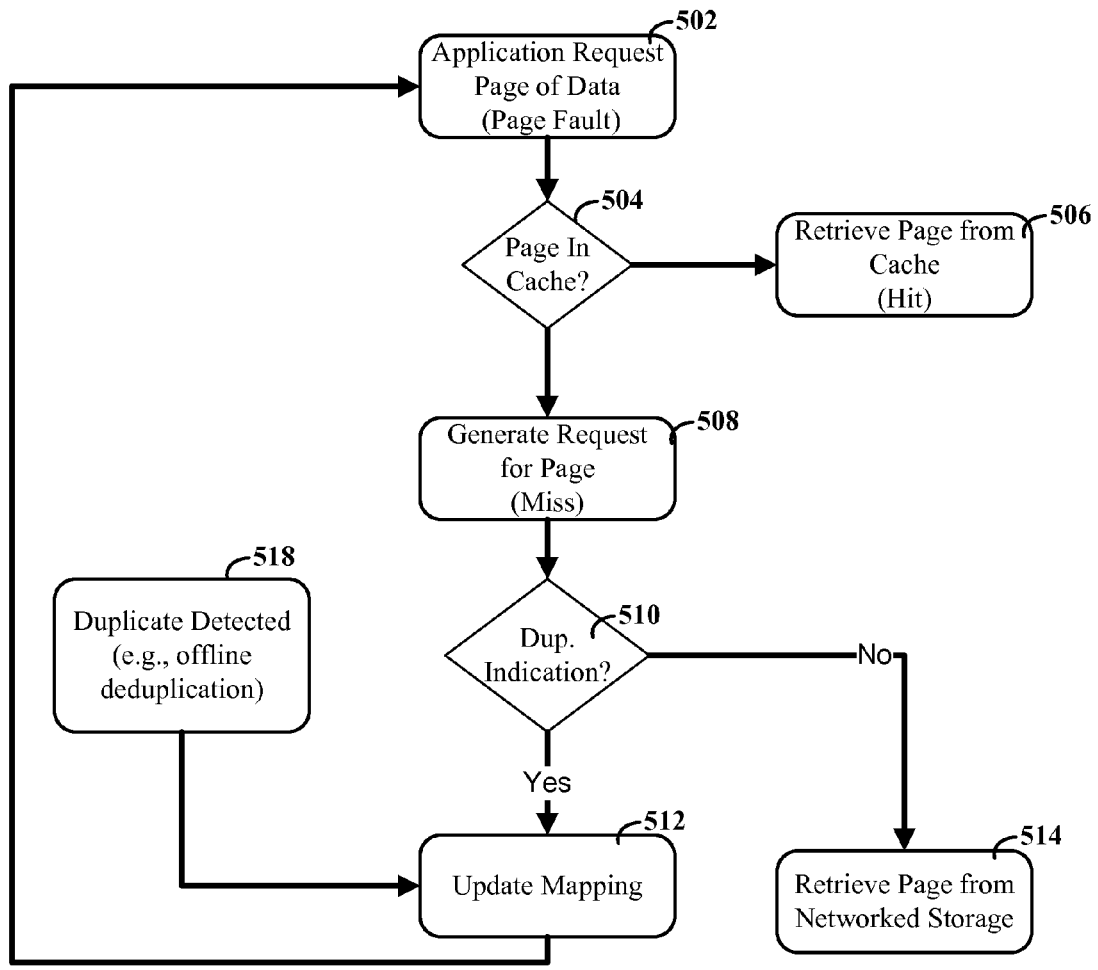
FIG. 5 depicts a flow diagram for providing deduplication within an application server side cache, consistent with embodiments of the present disclosure.

FIG. 5 depicts a flow diagram for providing deduplication within an application server side cache, consistent with embodiments of the present disclosure. When an application attempts to access a networked storage volume, cache management module checks whether the portion is cached in local cache, per block 502. For instance, when an application attempts to access a virtual memory location (page) that is not in main memory, a page fault can be generated along with a corresponding request for a page of data. The cache device can verify whether or not the requested page is currently stored in the cache, per block 504. For instance, a cache management module can consult page mapping information that points to a location at which the requested page resides within the cache and then determine whether or not the location is populated with the requested page.

If the requested page is in the cache (a cache hit), the data content for the requested page can be retrieved from the cache device, per block 506. If the requested page is not in the cache (a cache miss), the client can send or generate a page request for data stored on a networked storage, per block 508. A cache deduplication module (e.g., on the networked storage or a separate server) can determine whether or not the requested data is a duplicate of data stored elsewhere on the networked storage and generate an indication of the same (e.g., based upon fingerprint data generated by a fingerprint module).

The cache management module can determine whether an indication of duplicate data has been received, per block 510. If no indication is received, then the requested data can be retrieved from the networked storage, per block 514. If an indication is received, then the mapping for the requested page can be updated to correspond to the cache location for the duplicate data, per block 512. The request can then be processed with the new mapping, which results in the data for the requested page being retrieved from the cache.

In certain embodiments, a duplicate indication can be generated independently from an access request (or "offline"), per block 518. As discussed herein, this might include an indication created in response to an offline deduplication process that is correlated to data currently (or soon to be) stored in the cache. The mapping corresponding to the indication can then be updated, per block 512. Requests for the indicated pages will thereafter be directed to a common location within the cache.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
   identifying at a first time that a first page of data within at least one networked storage server is a duplicate of a second page of data stored within the at least one networked storage server, the identifying being performed by a deduplication server configured to monitor requests to access the at least one networked storage server;
   detecting a request transmitted over a network at a second time to the at least one networked storage server, the request requesting that the first page of data stored on the at least one networked storage server be provided to an application server, wherein the first time is before the second time; and in response to detecting the request, providing the indication to the application server over the network, the indication indicating that the first page of data is a duplicate of the second page of data stored within a cache that is locally accessibly by the application server relative to the network.

2. The method of claim 1, wherein the cache is configured as a write-through cache.

3. The method of claim 1, wherein the cache is a solid state memory device.

4. The method of claim 1, further comprising storing tracking data corresponding to data content of pages accessed by applications running on the application server and generating, based upon the tracking data, the indication.

5. The method of claim 4, wherein the tracking data includes fingerprint data of the data content of the pages accessed by the applications running on the application server.

6. The method of claim 1, further comprising:
identifying, in response to the indication, a location of the second page of data within the cache; and
mapping the first page of data to the location.

7. A system comprising:
a deduplication server coupled with a network, the deduplication server having a processor and a memory, deduplication server being configured to monitor data access requests transmitted over the network, wherein a first one of the data access requests specifies a first page of data, and generate, based upon tracking of data content stored in a cache device, an indication, wherein the indication indicates that data corresponding to the first data access request is a duplicate of data stored in the cache device as an existing page of data;
a networked storage server having a processor and a memory, the networked storage server being accessible over the network; and
an application server having a processor, a memory, the cache device, and a cache management module, the application server configured to access data stored on the networked storage server over the network, the cache device being configured to cache data stored on the networked storage server, and the cache management module being designed to:
detect the indication;
identify, in response to detecting the indication, a location of the existing page of data within the cache device; and
map the first page of data to the location, wherein the deduplication server, the networked storage server, and the application server are distinct from one another.

8. The system of claim 7, wherein the cache management module that is further designed to map the first page of data to the location by updating page tables of at least one client residing on the application server.

9. The system of claim 7, the deduplication server is further configured to generate, based upon tracking of data content stored in the cache device, the indication independently from the at least one request of the data access requests.

10. The system of claim 7, wherein the cache device is configured as a write-through-cache.

11. The system of claim 10, wherein the cache device includes a solid-state storage device that is accessible using an input/output (I/O) computer motherboard bus of the application server.

12. A computer program product comprising a non-transitory computer readable storage medium having program instructions embodied therewith, the program instructions executable by a computer to cause the computer to perform a method comprising:
identifying at a first time that a first page of data within at least one networked storage server is a duplicate of a second page of data stored within the at least one networked storage server, the identifying being performed by a deduplication server configured to monitor requests to access the at least one networked storage server;
detecting a request transmitted over a network at a second time, the request requesting that the first page of data stored on the at least one networked storage server be provided to an application server, wherein the first time is before the second time; and
in response to detecting the request, providing the indication, the indication indicating that the first page of data is a duplicate of the a second page of data stored within a cache located between the application server and the network.

13. The computer program product of claim 12, wherein the cache is configured as a write-through cache.

14. The computer program product of claim 12, wherein the cache is a solid state memory device.

15. The computer program product of claim 12, wherein the method comprises storing tracking data corresponding to data content of pages accessed by applications running on the application server and generating, based upon the tracking data, the indication.

16. The computer program product of claim 15, wherein the tracking data includes fingerprint data of the data content of the pages accessed by the applications running on the application server.

17. The computer program product of claim 12, further comprising:
identifying, in response to the indication, a location of the second page of data within a cache; and
mapping the first page of data to the location.

* * * * *